United States Patent
Wells et al.

(10) Patent No.: US 6,400,096 B1
(45) Date of Patent: Jun. 4, 2002

(54) CONTROL CIRCUIT FOR PIEZO TRANSFORMER BASED FLUORESCENT LAMP POWER SUPPLIES

(75) Inventors: James E. Wells, Merrimack, NH (US); James R. Garrett, Tewksbury, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/642,899

(22) Filed: Aug. 21, 2000

Related U.S. Application Data

(60) Provisional application No. 60/149,978, filed on Aug. 20, 1999.

(51) Int. Cl.[7] ............................................. H05B 37/02
(52) U.S. Cl. .............................. 315/224; 315/209 PZ; 315/307; 310/316.01
(58) Field of Search .......................... 315/224, 209 PZ, 315/307, DIG. 2, DIG. 4, DIG. 5, 209 R; 310/316.01, 318, 319; 363/95, 97

(56) References Cited

U.S. PATENT DOCUMENTS

| | | | |
|---|---|---|---|
| 4,604,552 A | 8/1986 | Alley et al. | 315/176 |
| 5,548,189 A | 8/1996 | Williams | 315/224 |
| 5,675,484 A | 10/1997 | Shimada | 363/71 |
| 5,726,536 A | 3/1998 | Hagiwara | 315/276 |
| 5,731,652 A | 3/1998 | Shimada | 310/316.01 |
| 5,768,111 A | 6/1998 | Zaitsu | 363/15 |
| 5,796,213 A | 8/1998 | Kawasaki | 315/209 R |
| 5,834,907 A | 11/1998 | Takehara | 315/307 |
| 5,854,543 A | 12/1998 | Satoh et al. | 315/307 |
| 5,872,419 A | 2/1999 | Hall et al. | 310/359 |
| 5,886,477 A | 3/1999 | Honbo et al. | 315/209 PZ |
| 5,894,184 A | 4/1999 | Furuhashi et al. | 310/316 |
| 5,910,711 A | 6/1999 | Porath et al. | 315/291 |
| 5,923,546 A | 7/1999 | Shimada et al. | 363/40 |
| 6,087,787 A | 7/2000 | Williams | 315/307 |
| 6,118,221 A1 * | 3/2001 | Kumasaka et al. | 315/208 PZ |
| 6,198,198 B1 * | 3/2001 | Fujimura et al. | 310/316.01 |
| 6,239,558 B1 * | 5/2001 | Fujimura et al. | 315/307 |

OTHER PUBLICATIONS

Takeshi Inoue, et al., "Third Order Longitudinal Mode Piezoelectric Ceramic Transformer for High–Voltage Power Inverter", Jul. 1998, IEICE Trans. Electron., Vol. E81–C, No. 7, pp. 1128–.

C. Y. Lin et al., "High–Voltage Applications of the Piezo-electric Transformers", Virginia Power Electronics Center, Jan. 2, 1997.

* cited by examiner

Primary Examiner—Don Wong
Assistant Examiner—Ephrem Alemu
(74) Attorney, Agent, or Firm—W. Daniel Swayze, Jr.; W. James Brady; Frederick J. Telecky, Jr.

(57) ABSTRACT

A control circuit for a piezo transformer based power supply for a fluorescent lamp includes driver circuitry generating pulse waveforms for providing excitation to primary inputs of the piezo transformer, and circuitry for regulating lamp current and the voltage across the piezo transformer primary inputs. The frequency of the pulse waveforms is varied in response to the magnitude of lamp current to maintain a predetermined desired lamp current as represented by a current reference signal. The duty cycle of the driver circuitry is varied in response to the magnitude of the voltage across the piezo transformer primary inputs to maintain a predetermined desired piezo primary voltage as represented by a voltage reference signal. The piezo transformer is operated as close to resonance as possible, contributing to greater circuit efficiency. The driver circuitry in the control circuit employs four transistors arranged as a full bridge with respect to the piezo transformer primary inputs. The phase of drive signals supplied to one pair of the transistors is varied with respect to the phase of drive signals supplied to the other pair, thereby varying duty cycle and average voltage of the piezo transformer primary inputs. A controller integrated circuit contains a number of components of the control circuit, enabling its use in a variety of piezo-based power supply applications.

11 Claims, 6 Drawing Sheets

CONTROL CIRCUIT FOR PIEZO TRANSFORMER BASED FLUORESCENT LAMP POWER SUPPLIES

CROSS REFERENCE TO RELATED APPLICATIONS

This application claims priority under 35 U.S.C. §119(e) of provisional application No. 60/149,978 filed Aug. 20, 1999.

STATEMENT REGARDING FEDERALLY SPONSORED RESEARCH OR DEVELOPMENT

Not Applicable

BACKGROUND OF THE INVENTION

The present invention is related to the field of power circuits, and more particularly to power supply circuits using piezoelectric transformers to supply power to fluorescent lamps.

Recent advances in ceramics technology have yielded a new generation of so-called "piezoelectric transformers" (also referred to herein as "piezo transformers") that are useful in certain applications. These devices, which are constructed using laminated thin layers of ceramic material, exploit a well-known phenomenon called the "piezoelectric effect" to provide AC voltage gain, in contrast to the magnetic field effects relied upon by conventional wound transformers. Like conventional transformers, piezo transformers are fairly rugged and can be used to obtain voltage gain in high-voltage applications. Additionally, due to their thin profile, piezo transformers can be used in applications where bulkier wire-wound transformers are impractical. For example, piezo transformers are used in power supplies that provide high-voltage power to fluorescent lamps used as backlights in portable computers. Due to their thin profiles, piezo transformers used in such applications do not adversely affect the desired sleekness of the portable computer enclosure.

Piezo transformers have recommended operating voltage ratings, arising in part from their ceramic construction. If the input and/or output voltage of a piezo transformer is not within the ratings of the device, then undesirable conditions such as unstable operation, overheating, or failure of the piezo transformer may result. It is therefore important that power supply circuits using piezo transformers comply with these operating voltage ratings.

Piezo transformers operate most efficiently when operated at frequencies at or near a multiple of a fundamental resonant frequency, which is a function of mechanical characteristics of the transformer such as material type, dimensions, etc. However, piezo transformers are high-impedance devices, and therefore their resonance characteristics as well as other characteristics are sensitive to the loading of the transformer output in operational circuits. Resonant frequency, voltage gain at the resonant frequency, and sharpness of the gain-versus-frequency curve all diminish with increased loading.

The diminishing of resonant frequency and gain with an increase in loading are purposely exploited when a piezo transformer is used to drive a fluorescent lamp. The frequency of the signal applied to the primary inputs of the piezo transformer is slowly swept from a frequency higher than the unloaded resonant frequency toward lower frequencies. As the resonant frequency is approached, the gain increases to the point that the transformer output voltage is sufficiently high to "strike", or initiate conduction in, the lamp. Once the lamp begins conducting, it presents a much higher load to the transformer, causing the voltage gain and therefore the output voltage of the transformer to drop considerably. The conduction characteristics of the lamp are such that it continues to conduct current at the reduced voltage, so the circuit then enters a stable, lower-voltage operating condition. The intensity of the lamp is regulated by controlling the frequency of the AC drive supplied to the piezo transformer as a function of the lamp current.

There are numerous portable computers and other devices in use today, and therefore a number of different configurations of power supply circuits for fluorescent lamps used for backlighting or other purposes. Each unique circuit entails costs associated with design, testing, qualification, fabrication and maintenance. Additionally, each circuit is generally designed to operate with one or at most a limited number of different sets of operating parameters, such as the permissible range of lamp current, the DC voltage from which the power supply circuit obtains power, and other parameters. One circuit may be incapable of operation in other environments, or at best may operate with only low efficiency.

BRIEF SUMMARY OF THE INVENTION

In accordance with the present invention, a control circuit for a piezo transformer based power supply for a fluorescent lamp is disclosed that can be readily adapted to be used in a variety of operating environments, and has features ensuring that optimum efficiency is attained despite the variability of key operational parameters such as DC supply voltage.

The disclosed control circuit includes driver circuitry that supplies respective pulse waveforms to the primary inputs of the piezo transformer, and circuitry for regulating the current in the fluorescent lamp and the voltage across the primary inputs of the piezo transformer. The lamp current regulating circuitry detects the magnitude of current in the fluorescent lamp and varies the frequency of the pulse waveforms generated by the driver circuitry so as to maintain a predetermined desired lamp current, as represented by a predetermined current reference signal. The piezo primary voltage regulating circuitry detects the magnitude of the voltage across the primary inputs of the piezo transformer, and varies the duty cycle of the driver circuitry so as to maintain a predetermined desired piezo primary voltage, as represented by a predetermined voltage reference signal.

In the disclosed system, efficiency is improved by operating the piezo transformer at its optimal gain (i.e., the ratio $V_{out}/V_{in}$) The value of $V_{out}$ is determined by the magnitude of lamp current, which in turn is determined by the desired lamp intensity. The RMS voltage value at the piezo transformer primary is programmed such that as the system's DC input voltage is varied (for example from 7 to 22V in the case of a typical notebook computer), the RMS voltage at the piezo transformer primary is held constant. This results in a constant gain and an operating frequency optimized for the piezo transformer. Also, the RMS input voltage to the piezo primary can be programmed to change with lamp load in order to optimize the gain and frequency as the dimming level of the lamp is changed. The piezo transformer can be operated within its recommended operating region despite large variations in the the system's DC input voltage and/or lamp load.

The disclosed driver circuitry employs four switching transistors arranged as a full bridge with respect to the primary inputs of the piezo transformer. The switching transistors include a first pair for providing a positive pulse to the piezo primary, and a second pair for providing a negative pulse to the piezo primary. Phase shifting circuitry is used to vary the phase of drive signals supplied to the second pair of switching transistors with respect to the phase of drive signals supplied to the first pair of switching transistors so as to maintain the desired voltage across the piezo primary.

A disclosed controller integrated circuit contains a number of components connected to input/output pins such that the integrated circuit can be used in a variety of piezo-based power supply applications.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

The disclosure of provisional application No. 60/149,978 filed Aug. 20, 1999 is hereby incorporated by reference herein.

Figure 1:
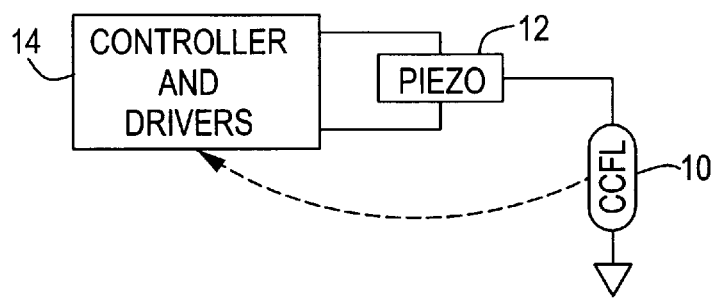
FIG. 1 is a block diagram of a piezo transformer based power supply for a cold cathode fluorescent lamp (CCFL) as known in the art.

FIG. 1 shows a prior art arrangement for providing power to a cold cathode fluorescent lamp (CCFL) 10. The CCFL 10 is driven by the secondary-side output of a piezo transformer 12. The primary-side inputs to the piezo transformer 12 are provided by controller and driver circuitry 14. As indicated by the dotted line, the operating current of the CCFL is sensed and provided to the controller 14 as feedback, enabling the controller 14 to regulate the lamp current and thus the lamp intensity.

Figure 2:
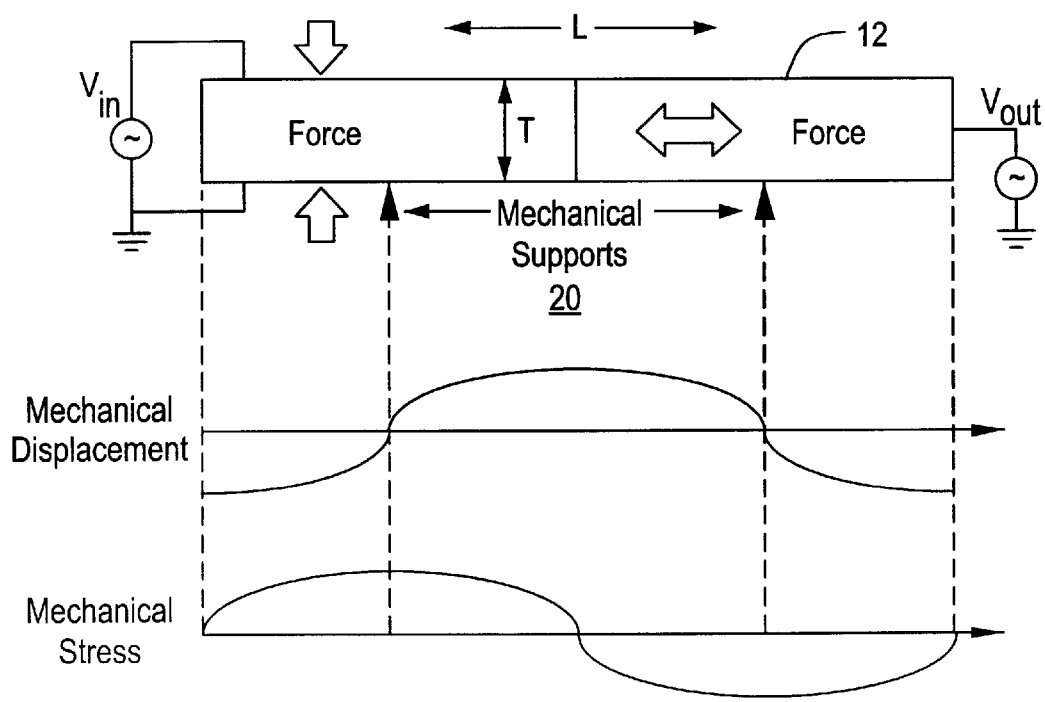
FIG. 2 is a diagram illustrating the operation of a piezo transformer as known in the art.

FIG. 2 depicts the operation of the piezo transformer 12. The piezo transformer 12 operates in what is referred to as a "longitudinal mode" in which mechanical motion in the thickness direction T causes motion in the longitudinal or length direction L. An AC voltage $V_{in}$ applied to primary-side electrodes (not shown) generates mechanical expansion and compression in the thickness direction T. The mechanical displacement in the thickness direction T is transferred to the longitudinal direction L. The longitudinal mechanical displacement induces an output voltage $V_{out}$ at a secondary-side electrode (not shown).

The piezo transformer 12 provides a voltage gain whose value depends on several factors. For a given material, the gain is related to the dimensions of the device as well as the number of layers used for the primary-side electrodes:

$$V(\text{gain}) \sim \frac{\text{Length} \cdot \text{layers}}{\text{thickness}}$$

Efficient energy transfer is achieved by operating the device near resonance. Resonance occurs at multiple standing wave frequencies $f_n$ based on the transformer's length (L) and the velocity (v) of mechanical wave propagation:

$$f_n = n \frac{v}{2L}$$

As shown in FIG. 2, mechanical supports 20 are placed at locations ¼ and ¾ along the length of the piezo transformer 12, which allows the piezo transformer 12 to generate standing waves having wavelength L.

Figure 3:
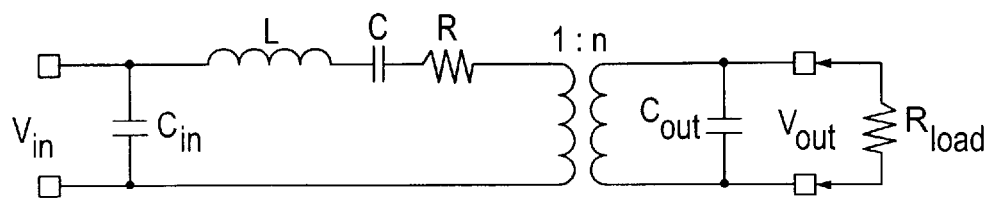
FIG. 3 is a schematic diagram representing a model of a piezo transformer as known in the art.

FIG. 3 shows an equivalent electrical circuit model for the piezo transformer 12. A large primary capacitance $C_{in}$ arises from the multi-layer construction of the primary-side electrodes. The value of the capacitance $C_{in}$ is given below, where L is transformer length, W is width, and T is thickness:

$$C_{in} \approx \frac{L \cdot W \cdot \text{layers} \cdot \varepsilon}{2 \cdot T}$$

An output capacitance $C_{out}$ is formed between the secondary electrode and the primary electrodes. Since the secondary electrode is small and the distance from the primary is large, output capacitance is typically only tens of picofarads.

$$C_{out} \approx \frac{2 \cdot T \cdot W \cdot \varepsilon}{L}$$

A piezo transformer has many resonant frequencies, and a different gain-versus-frequency characteristic in the neighborhood of each. When operation at or near a given resonant frequency is desired, it is advisable that the piezo transformer be excited by a sinusoidal signal, in order to avoid undesired resonant frequencies. The value of what can be called the "fundamental" resonant frequency ($w_o$) is proportional to the elasticity (Y) and density (p) of the material, as well as the length, as follows:

$$\omega_0 \propto \frac{1}{\text{Length}} \sqrt{\frac{Y}{\rho}}$$

The piezoelectric gain near a single resonant frequency can be modeled by a series R, L, and C circuit as depicted in FIG. 3. For such a circuit, the resonant frequency and "Q" or sharpness of its response are given by the following:

$$\omega_0 = \frac{1}{\sqrt{L \cdot C}} \qquad Q = \omega_0 \cdot \frac{L}{R}$$

Figure 4:
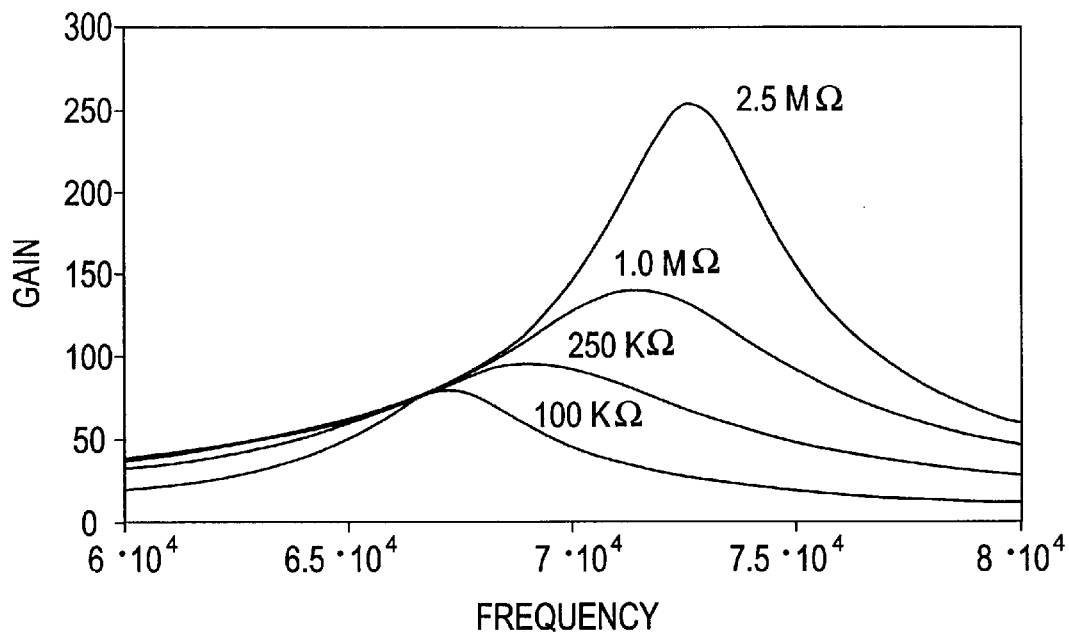
FIG. 4 is a plot of the gain characteristics with respect to loading of piezo transformers as known in the art.

FIG. 4 shows a plot of gain versus frequency for a typical piezo transformer with four different output load values $R_L$. As shown, the resonant frequency diminishes from about 72.5 KHz to about 67 KHz as the value of $R_L$ diminishes from 2.5 MΩ to 100 KΩ. Also, the peak and average gain diminish with diminishing load resistance as shown.

Figure 5:
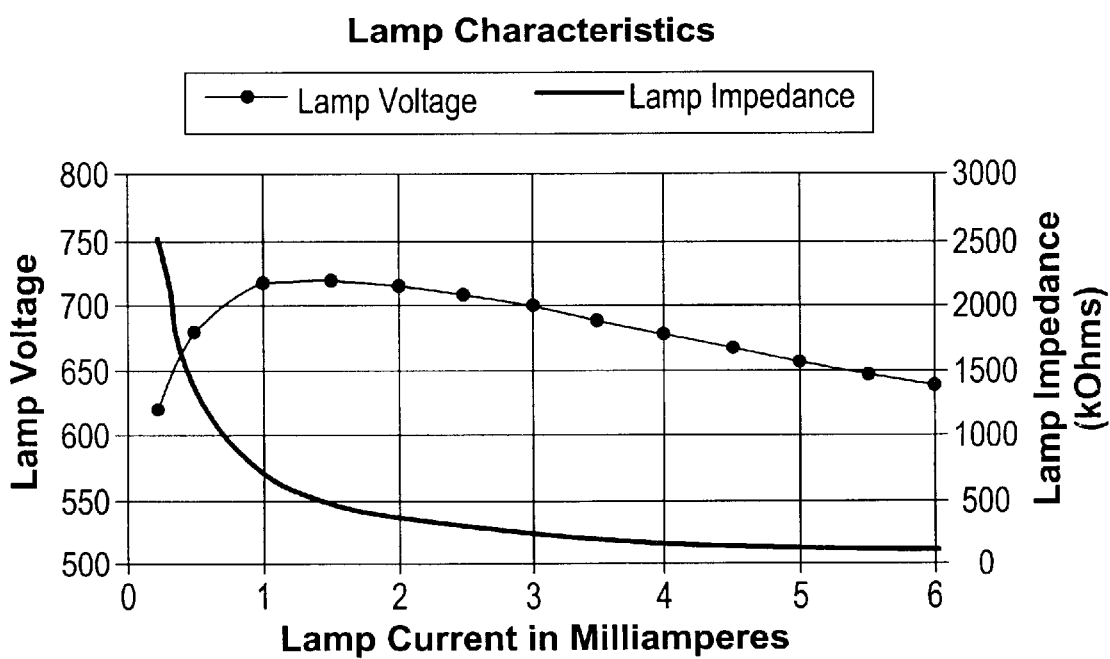
FIG. 5 is a plot of lamp voltage and impedance characteristics with respect to current of CCFLs as known in the art.

FIG. 5 shows the voltage-versus-current and impedance-versus-current characteristics of a typical CCFL such as the CCFL 10. As shown, it is necessary to provide an increasing lamp voltage to bring the lamp current up to about 1 mA, and the required lamp voltage decreases with further increases in lamp current. The lamp impedance, which is the ratio of voltage to current, is thus very high at low current levels, and falls to a much lower value as current rises.

The characteristics of the piezo transformer 12 and the CCFL 10 as shown in FIGS. 4 and 5 are exploited to control the supply of power to CCFL 10. When the CCFL 10 is unlit, it provides essentially infinite load resistance. As a result, the gain characteristic of the piezo transformer 12 resembles the upper curve in FIG. 4. The controller 14 generates an input voltage $V_{in}$ having a frequency at or near the resonant frequency. As a result, the output voltage $V_{out}$ attains a sufficiently high value to "strike" the lamp, or cause the lamp to being conducting current and emit light.

Once the CCFL 10 is conducting sufficient current, its impedance drops considerably, as shown in FIG. 5. This change significantly increases the loading of the piezo transformer 12. As a result, the gain characteristic of the piezo transformer 12 shifts toward the lower curve in FIG. 4, i.e., its gain and resonant frequency shift to lower values. The controller 14 automatically reduces the frequency of the input voltage signal $V_{in}$ in order to reduce the voltage gain of the piezo transformer 10 to a point where the desired operating current is reached.

Figure 6:
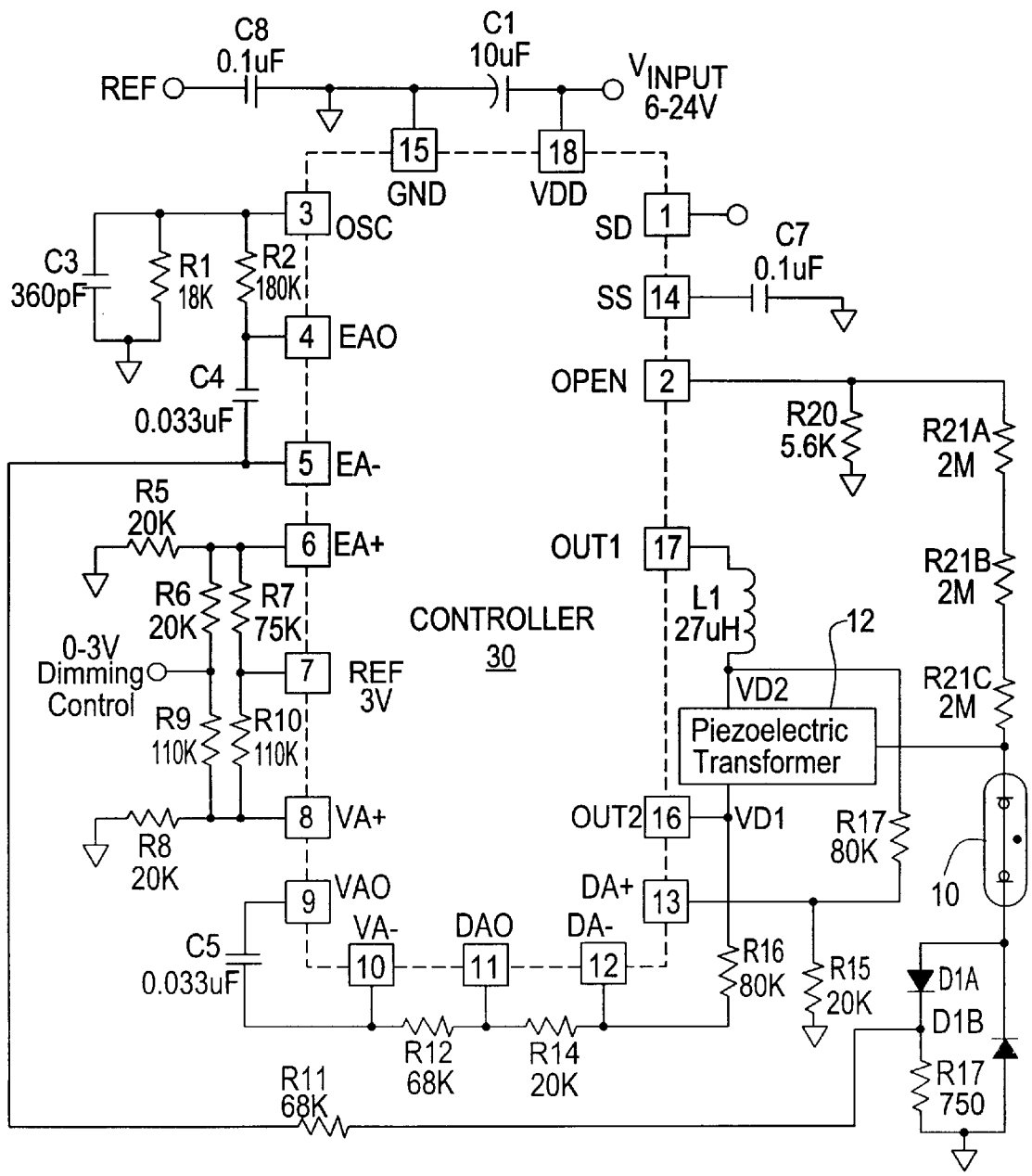
FIG. 6 is a schematic diagram of a CCFL power supply circuit according to the present invention.
Figure 7:
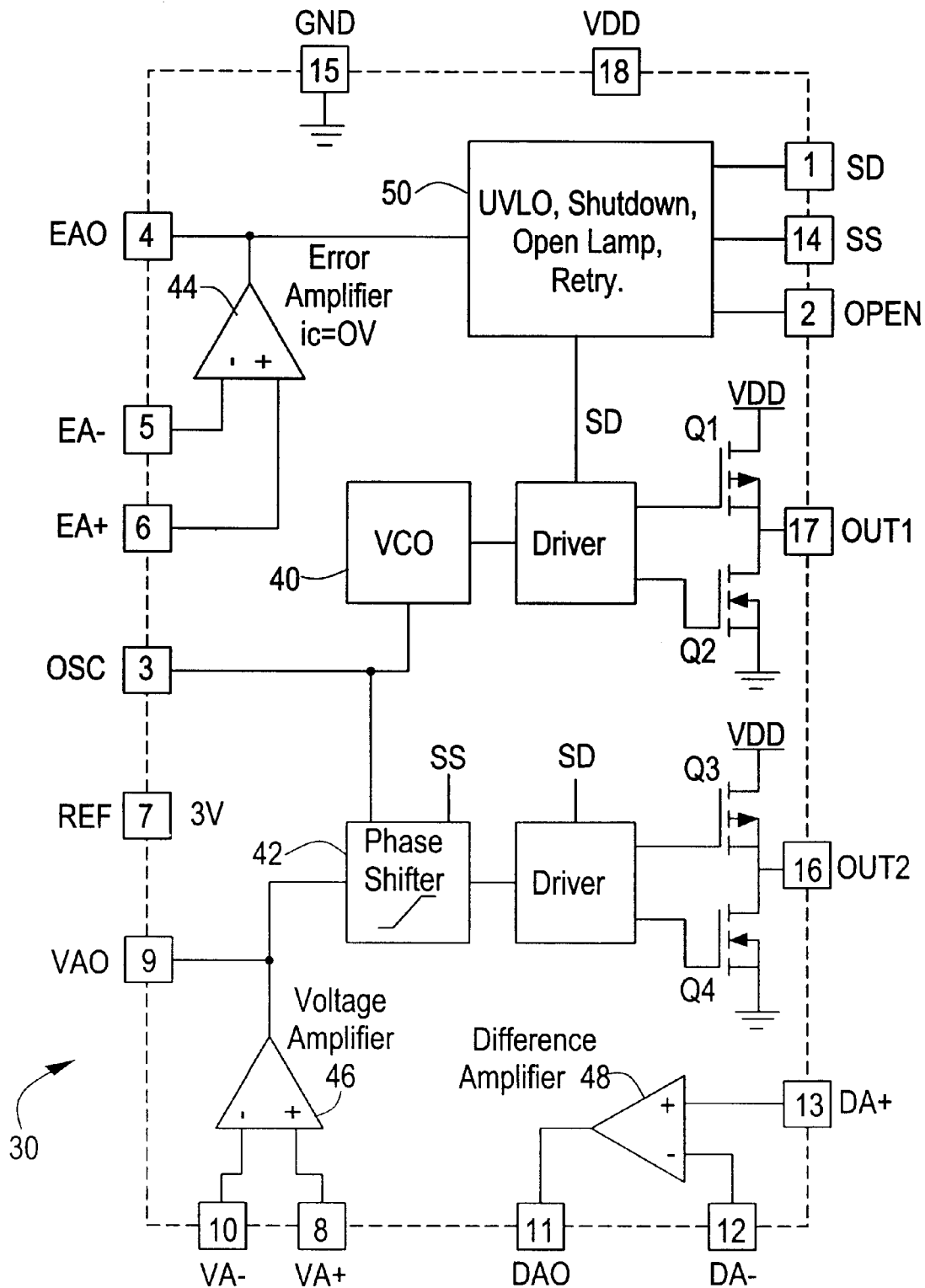
FIG. 7 is a block diagram of a controller circuit used in the CCFL power supply circuit of FIG. 6.

FIGS. 6 and 7 show detailed schematic diagram of a piezo-based power supply for a CCFL. In FIG. 6, several components are shown having connections to a controller 30, the details of which are shown in FIG. 7. The controller 30 can be realized as a single integrated circuit (IC) that interfaces to external circuitry by input/output pins labeled as shown. As a separate component, a single-IC controller can be flexibly used in a variety of different CCFL power supply circuits. As shown in FIG. 7, the controller 30 includes switching transistors Q1, Q2, Q3 and Q4, which implement a full bridge inverter circuit in the circuit of FIG. 6. A voltage controlled oscillator (VCO) 40 generates a variable frequency signal used to drive the transistors Q1–Q4. The transistors Q1 and Q2 are driven in phase with the VCO signal and at ½ its frequency. A phase shifter circuit 42 is used to provide a variable phase shift to the signal driving the transistors Q3 and Q4. This operation is described below. The controller 30 also includes an error amplifier (EA) 44, voltage amplifier (VA) 46, difference amplifier (DA) 48, and circuitry 50 that performs miscellaneous functions such as undervoltage detection, shutdown, and open lamp detection.

Referring back to FIG. 6, the controller 30 provides pulse waveform drive to the piezo transformer 12 via pins labeled OUT1 and OUT2. An inductor L1 is placed in series between OUT1 and the piezo to create a tank circuit with the input capacitance of the piezo transformer 12, as described above. The pulse waveform from the controller 30 provides excitation for the tank circuit, resulting in a substantially sinusoidal voltage across the piezo primary.

The current through the CCFL 10 is detected by a circuit including diodes D1A and D1B and resistors R17 and R11. The magnitude of the current is represented as a voltage applied to one input of the EA 44 via a pin labeled EA−. The other input to the error amplifier, via pin EA+, is a reference voltage developed by a network of resistors R6–R10 and a 3 volt reference signal REF generated by the controller 30. As shown, an externally generated dimming control signal can be supplied to this network to effect dimming of the CCFL 10.

The output of the error amplifier 44 is provided to a network including capacitors C3 and C4 and resistors R1 and R2, which are used to establish the range of operating frequencies of the VCO 40. In conjunction with the capacitor C4 and the resistor R11, the error amplifier 44 integrates the output of the current sensing circuitry, and this integrated value affects the operating frequency of the VCO 44 by its influence at the OSC pin.

The circuit of FIGS. 6 and 7 operates from a DC supply voltage $V_{input}$ that can range from 6 to 24 volts. Power regulation circuitry within the controller 30 (not shown) is used to generate desired operational voltages for the various on-chip components. As shown in FIG. 7, the transistors Q1 and Q3 provide switched paths between the DC supply voltage (labeled VDD within controller 30) and the output pins OUT1 and OUT2 respectively.

Referring to FIG. 6, the voltage between nodes VD1 and VD2, which is the voltage across the primary of the piezo transformer 12, is sampled by an amplifier circuit including the DA 48 of FIG. 7 and resistors R14, R16 and R17. The output of the DA 48 is connected to one input of an integrating amplifier circuit including the VA 46 of FIG. 7, resistor R12, and capacitor C5. The output of the VA 46 provides a control signal for the phase shifter circuit 42 of FIG. 7.

As described above, the current through the CCFL 10 is controlled by adjusting the frequency of operation. The voltage at the pin EA+ represents the magnitude of the lamp current in accordance with the following:

$$V_{EA-} = I_{lamp} \cdot R17 \cdot \frac{\sqrt{2}}{\pi} \quad \text{(eq1)}$$

The EA 44 regulates the lamp current to a level set by the externally supplied dimming control voltage. When this voltage is in the range of 0–3 volts, it affects the voltage at pin EA+ as follows:

$$V_{EA+} = 3V \cdot \left[\frac{R5 // R6}{R7 + R5 // R6}\right] + V_{DIM}\left[\frac{R5 // R7}{R6 + R5 // R7}\right] \quad \text{(eq2)}$$

Once R5 is selected, R6 and R7 can be determined from the following equations:

$$R6 = \frac{R5 \cdot (3V - V_{MAXEA-})}{(V_{MAXEA-} - V_{MINEA-})} \quad \text{(eq3)}$$

$$R7 = \frac{R5}{V_{MINEA-}}(3V - V_{MAXEA-}) \quad \text{(eq4)}$$

As an example, if 5 mA lamp current and a 5:1 dimming range are desired, the value of resistor R17 may be chosen as 750 ohms. As a result, the voltage VEA+ falls within the range 1.7 V to 0.35 V. If resistor R5 is set to 20 KΩ, then R6 and R7 are calculated from equations 3 and 4 to be 20 KΩ and 75 KΩ respectively. Substituting these values into equations 1 and 2 (and assuming VEA+=VEA+ in closed loop operation) results in the following relationship for dimming operation:

$$I_{lamp} = \frac{0.35 + 0.45 \cdot V_{DIM}}{338} \quad \text{(for FIG. 1)}$$

When the current through the CCFL 10 is below the level programmed at pin EA+, the output of the EA 44 increases and causes the operating frequency generated by the VCO 40 to decrease. When lamp current is greater than the programmed level, the opposite occurs. The operational frequency range is programmed at the OSC pin using resistors R1 and R2 and capacitor C3. Voltage controlled oscillation occurs by allowing the voltage at the OSC pin to decay from 3 volts to 1 volt. The decay time is determined by the value of C3 and the discharge (or charge) current generated in R1 and R2. When the voltage at the OSC pin reaches 1 volt, a gated current source (not shown) within the VCO 40 is turned on and drives the voltage at the OSC pin back to 3 volts. The nominal frequency at OSC is set by R1 and C3 in accordance with the following:

$$f_{nom} = \frac{1}{R1 \cdot C3 \cdot \ln(3)} \text{ Hz} \quad \text{(eq5)}$$

With R1=18 KΩ and C3=360 pF, the nominal frequency of the oscillator is 140 kHz. As indicated above, the transistors Q1–Q4 switch at one-half this frequency, or 70 kHz in this case. The frequency range is programmed by adding in the effect of R2 and the output $V_{EAO}$ of the EA 44:

$$f(V_{EAO}) = \left[\frac{R1+R2}{R1 \cdot R2 \cdot C3}\right] \bigg/ \ln\left[\frac{(3-V_{EAO}) \cdot R1 + 3 \cdot R2}{(1-V_{EAO}) \cdot R1 + R2}\right] \quad \text{(eq6)}$$

The value of R2 is selected to be approximately ten times the value of R1, and thus in this example R2 is 180 KΩ. This selection results in a frequency range of approximately +/−10% from nominal. Using equation 6, the maximum frequency (when $V_{EAO}$=0 V) is equal to 154 kHz, and the minimum frequency (when $V_{EAO}$=3.5 V) is equal to 125 kHz in the example circuit.

To improve efficiency over a wide input voltage range, the circuit of FIGS. 6 and 7 includes a control loop programmed to limit the voltage across the primary of the piezo transformer 12. This loop includes the DA 48, VA 46 and phase shifter 42 of FIG. 7, as well as associated components shown in FIG. 6. By shifting the phase of the drive signals for Q3 and Q4 with respect to the drive signals for Q1 and Q2, the duty cycle of the piezo transformer primary voltage is controlled, and therefore the average value of the primary voltage is controlled. Because the reference voltage appearing at VA+ changes in response to dimming, the average voltage that is maintained by the control loop changes accordingly, and therefore efficient operation is maintained throughout the operating range of the lamp 10.

Figure 8A:
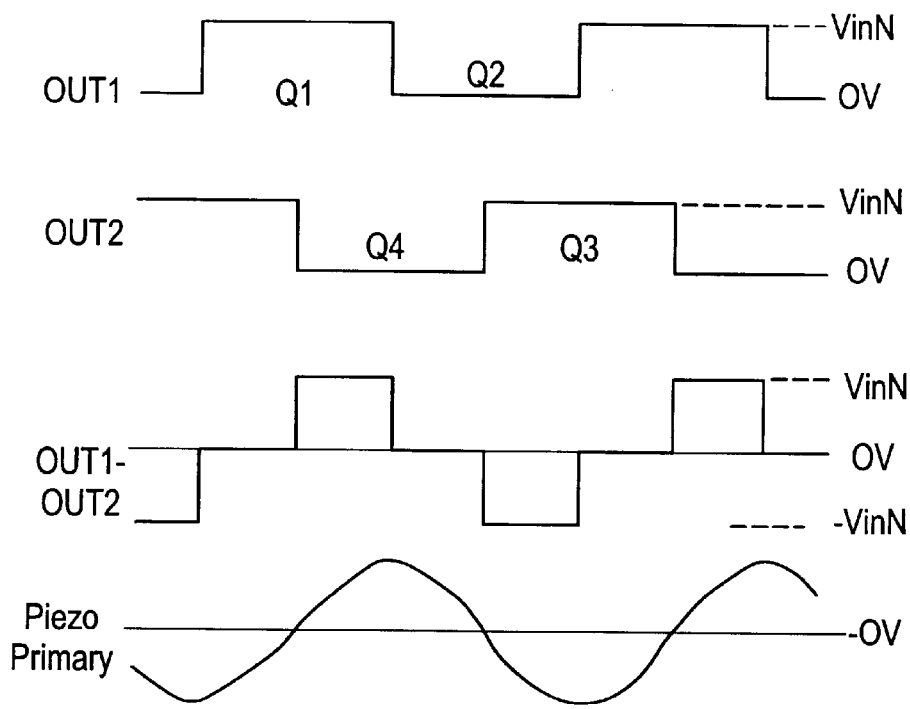
FIG. 8 is a timing diagram illustrating the operation of the CCFL power supply of FIG. 6.
Figure 8B:
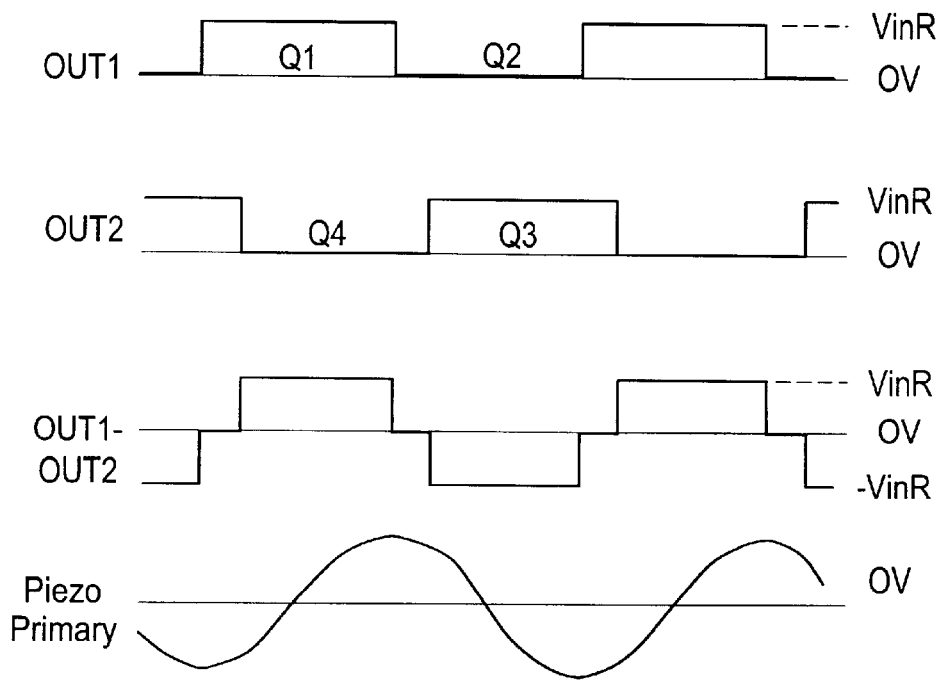
Figure 8C:
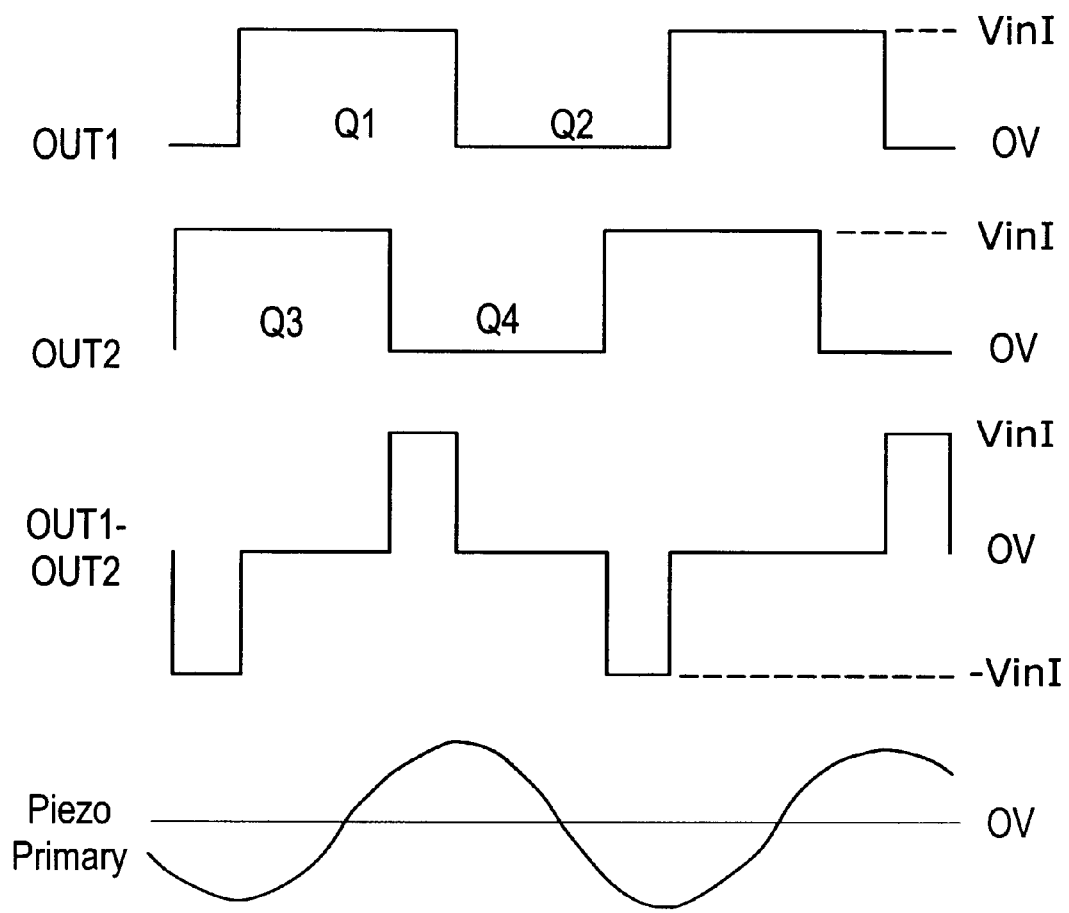

FIG. 8 illustrates the operation of the duty cycle control loop under three conditions. FIG. 8A shows operation with a "nominal" DC input voltage $V_{inN}$ of about 10 volts. FIG. 8B shows operation with a "reduced" DC input voltage $V_{inR}$ of about 7 volts. FIG. 8C shows operation with an "increased" DC input voltage $V_{inI}$ of about 13 volts.

In FIG. 8, periods of the waveforms for OUT1 and OUT2 are labeled to identify which of the four transistors Q1–Q4 are conducting. The drive signals supplied to transistors Q1 and Q2 are 180 degrees out of phase, as are the drive signals supplied to transistors Q3 and Q4. Although not shown in the Figures, the controller 30 includes anti-cross-conduction circuitry to prevent transistors Q1 and Q2 from conducting simultaneously when drive is switched from one to the other.

In the nominal case shown in FIG. 8A, the signals OUT1 and OUT2 have amplitude equal to $V_{inN}$, and the signal OUT2 is about −90 degrees out of phase with the signal OUT1. During about half of every other half cycle, transistors Q1 and Q4 are conducting simultaneously, so that the difference OUT1–OUT2 is a positive pulse, which is provided to the series combination of the inductor L1 and the piezo primary. During about half of the other half cycles, transistors Q2 and Q3 are conducting simultaneously, so that the difference OUT1–OUT2 is a negative pulse provided to the series combination of the inductor L1 and the piezo primary. The resulting piezo primary voltage is a substantially sinusoidal waveform having an RMS voltage of about 7.5 volts.

It will be appreciated from FIGS. 8B and 8C that as the input voltage changes, the amplitude of the difference value OUT1–OUT2 changes accordingly, and the duty cycle changes in an opposite manner such that the RMS value of the sinusoidal piezo primary voltage remains at about 7.5 volts. In FIG. 8B, the amplitude of OUT1–OUT2 is reduced to 2*$V_{inR}$, but the duty cycle is increased substantially to compensate for this reduced amplitude. Similarly, in FIG. 8C the amplitude of OUT1–OUT2 is increased to 2*$V_{inI}$, but the duty cycle is commensurately decreased.

This operation can be quantified as follows. The first element of the voltage clamping feedback loop is the DA 48. When R14=R15 and R16=R17, the output of the difference amplifier (DAO) is:

$$V_{DAO} = \frac{R14}{R16} \cdot (V_{D2} - V_{D1}) \quad \text{(eq7)}$$

Since the DA 48 produces only a positive output voltage, $V_{DAO}$ is zero volts when VD2<VD1. As with lamp current (equation 1), $V_{DAO}$ is averaged by the integrating voltage amplifier circuit including VA 46, resistor R12 and capacitor C5. Assuming a sinusoidal voltage across the piezo transformer primary, its average value is given by:

$$V_{VA-} = \frac{R14 \cdot V_{PPRMS} \cdot \sqrt{2}}{R16 \cdot \pi} \quad \text{(eq8)}$$

Where Vpprms is the RMS voltage across the piezoelectric transformer primary (VD2–VD1). For the circuit in FIG. 1, R16=R17=20 KΩ and R14=R15=80 KΩ, producing a gain of ¼. In order to achieve high efficiency for the piezoelectric transformer used in FIG. 1, primary voltage is controlled to 7 volts RMS at maximum lamp current and 3.5 volts RMS at minimum lamp current. From equation 8, VVA− is regulated to 0.8V at full intensity and 0.4V when dimmed to lowest intensity. VVA− is controlled by the voltage amplifier at VA+ and the 0–3V dimming control as follows:

$$V_{VA+} = 3V \cdot \left[\frac{R8 // R9}{R10 + R8 // R9}\right] + V_{DIM}\left[\frac{R8 // R9}{R9 + R8 // R10}\right] \quad \text{(eq9)}$$

Once R8 is selected, R9 and R10 can be determined from the following equations:

$$R9 = \frac{R8 \cdot (3V - V_{MAXVA-})}{(V_{MAXVA-} - V_{MINVA-})} \qquad (eq10)$$

$$R10 = \frac{R8}{V_{MINVA-}} (3V - V_{MAXVA-}) \qquad (eq11)$$

With R8 set to 20 KΩ and VEA+ ranging from 0.4 to 0.8V (see above), R9 and R10 are calculated to be 110 KΩ. Substituting these values into equations 8 and 9 (assuming VVA+=VVA- in closed loop operation):

$$V_{PPRMS} = \frac{0.4 + 0.133 \cdot V_{DIM}}{0.1125} \qquad \text{(for FIG. 1)}$$

Due to the high gain characteristics of the piezo transformer 12, it is important that operation be suspended if an open lamp occurs. Within the circuitry 50, a 2 volt comparator (not shown) is connected to the OPEN pin, and the output of this comparator triggers a shutdown of the circuitry when an open lamp is triggered. The voltage at which an open lamp shutdown occurs is given by the following, in which "R21" is equal to the sum of R21A, R21B and R21C:

$$V_{OPENRMS} = \frac{2 \cdot R21}{\sqrt{2} \cdot R20} \qquad (eq12)$$

In the above example, this value is approximately 1500 volts RMS.

Circuitry for a piezo transformer based power supply for a fluorescent lamp has been shown. Although the illustrated circuitry incorporates a full-bridge converter topology, the techniques described herein are applicable to other power topologies, such as half-bridge, push-pull and flyback topologies for example. It will be apparent to those skilled in the art that other modifications to and variations of the disclosed circuitry are also possible without departing from the inventive concepts disclosed herein, and therefore the invention should not be viewed as limited except to the full scope and spirit of the appended claims.

What is claimed is:

1. A control circuit for a piezo transformer based power supply for a fluorescent lamp, comprising:
    driver circuitry operative to generate pulse waveforms for excitation of primary inputs of the piezo transformer, the driver circuitry comprising four switching transistors arranged as a full bridge with respect to the primary inputs of the piezo transformer, the switching transistors including a first pair for providing a positive pulse waveform to the primary inputs of the piezo transformer and a second pair for providing a negative pulse waveform to the primary inputs of the piezo transformer;
    a first feedback circuit operative to detect the magnitude of current in the fluorescent lamp and to vary the frequency of the pulse waveforms generated by the driver circuitry so as to maintain a predetermined desired current in the fluorescent lamp; and
    a second feedback circuit operative to detect the magnitude of the voltage across the primary inputs of the piezo transformer and to vary the duty cycle of the difference between the pulse waveforms generated by the driver circuitry so as to maintain a predetermined desired voltage across the primary inputs of the piezo transformer, the second feedback circuit comprising phase shifting circuitry operative to vary the phase of drive signals supplied to the second pair of switching transistors with respect to the phase of drive signals supplied to the first pair of switching transistors to effect the varying of the duty cycle of the difference between the pulse waveforms.

2. A control circuit according to claim 1, wherein the second feedback circuit further includes a difference amplifier and an integrating voltage amplifier, the difference amplifier being operative to generate a voltage signal indicative of the instantaneous peak value of the voltage appearing across the primary inputs of the piezo transformer, and the integrating voltage amplifier being operative to generate a voltage signal indicative of an integrated value of the voltage signal generated by the difference amplifier, and wherein the phase shifting circuitry is operative in response to the voltage signal generated by the integrating voltage amplifier.

3. A control circuit according to claim 1, wherein the first feedback loop comprises:
    an error amplifier operative to integrate the difference between a lamp current feedback signal and a reference signal representing the desired lamp current; and
    a voltage controlled oscillator coupled to the error amplifier, the voltage controlled oscillator being operative to produce a control signal for the driver circuitry having a frequency that varies in relation to the output of the error amplifier so as to maintain the desired lamp current.

4. A control circuit according to claim 3, wherein the voltage controlled oscillator comprises a resistor-capacitor timing circuit and a gated current source, the resistor-capacitor timing circuit being operative to discharge a circuit node from a first voltage to a second voltage in a predetermined interval so as to establish a corresponding frequency for the control signal, the gated current source being operative to charge the circuit node from the second voltage to the first voltage substantially instantaneously with respect to the predetermined interval.

5. A control circuit according to claim 1, further comprising dimming circuitry operative in response to a dimming control input to vary the magnitude of the lamp current so as to change the intensity of light emitted by the lamp accordingly.

6. A control circuit according to claim 1, wherein the predetermined desired current and the predetermined desired voltage are represented by respective reference signals supplied to the first and second feedback circuits, and further comprising dimming circuitry operative in response to a dimming control input to vary the reference signals so as to vary the intensity of light emitted by the lamp while also varying the voltage across the primary inputs of the piezo transformer in a manner tending to maximize the efficiency of the piezo transformer.

7. A control circuit according to claim 1, wherein the primary inputs of the piezo transformer form part of a resonant tank circuit capable of generating a substantially sinusoidal piezo primary input voltage in response to an excitation input signal, and wherein the pulse waveform generated by the driver circuitry is supplied as the excitation input signal to the resonant tank circuit, such that the root-mean-square (RMS) value of the piezo primary input voltage is maintained at the predetermined desired value.

8. A controller integrated circuit for use in a piezo transformer based power supply for a fluorescent lamp, comprising:
    driver circuitry operative to generate respective pulse waveforms on first and second pins of the controller integrated circuit for excitation of primary inputs of the piezo transformer, the driver circuitry comprising four switching transistors arranged as a first pair for providing a positive pulse waveform to the primary inputs of the piezo transformer and a second pair for providing a negative pulse waveform to the primary inputs of the piezo transformer;

voltage controlled oscillator circuitry having an input connected to a third pin of the controller integrated circuit for coupling to external timing circuitry and to a current feedback signal representing the magnitude of current in the lamp, the voltage controlled circuitry being operative to generate a variable frequency control signal to control the operation of the driver circuitry such that the nominal frequency, the frequency range, and the variation of the frequency of the control signal are established by the external timing circuitry and the current feedback signal appearing at the third pin; and duty cycle control circuitry having an output coupled to the driver circuitry and having inputs for receiving voltage feedback signals indicative of the voltage across inputs of the piezo transformer, the duty cycle control circuitry being operative to control the duty cycle of the difference between the pulse waveforms generated by the driver circuitry in response to the voltage feedback signals, the duty cycle control circuitry including phase shifting circuitry operative to vary the phase of drive signals supplied to the second pair of switching transistors with respect to the phase of drive signals supplied to the first pair of switching transistors in response to the voltage feedback signals to effect the controlling of the duty cycle of the difference between the pulse waveforms.

9. A controller integrated circuit according to claim 8, wherein the duty cycle control circuit further includes a difference amplifier and an integrating voltage amplifier, the difference amplifier being operative to generate a voltage signal indicative of the instantaneous peak value of the voltage appearing across the primary inputs of the piezo transformer, and the integrating voltage amplifier being operative to generate a voltage signal indicative of an integrated value of the voltages signal generated by the difference amplifier.

10. A controller integrated circuit according to claim 8, further comprising an operation amplifier capable of being configured as an error amplifier for integrating the difference between an instantaneous lamp current feedback signal and a reference signal representing a desired lamp current, the output of the error amplifier being connected to a fourth pin to be coupled by external circuitry to the third pin as the current feedback signal used by the voltage controlled oscillator circuitry.

11. A controller integrated circuit according to claim 8, wherein the voltage controlled oscillator circuitry comprises a gated current source operative when the voltage of the third pin reaches a first predetermined voltage to charge the third pin from the first voltage to a second predetermined voltage substantially instantaneously with respect to the period of the control signal.

* * * * *